United States Patent Office 3,282,681
Patented Nov. 1, 1966

3,282,681
SEPARATION OF URANIUM AND
PLUTONIUM VALUES
James B. Knighton, Joliet, and Robert K. Steunenberg, Naperville, Ill., assignors to the United States of America as represented by the United States Atomic Energy Commission
No Drawing. Filed Feb. 8, 1966, Ser. No. 526,328
10 Claims. (Cl. 75—84.1)

The invention described herein was made in the course of, or under, a contract with the United States Atomic Energy Commission.

This invention relates to the separation of substances from each other and more particularly relates to the separation of plutonium values and uranium values from each other and from other substances.

Reactor Handbook, Second Edition, Vol. II, Fuel Reprocessing (1961), discusses a number of methods which are in use to separate plutonium values from uranium values and radioactive fission products. These may be concentrated into two primary methods, one known as an aqueous separation and the other commonly referred to as the pyrochemical method.

The aqueous method requires dissolution of the irradiated nuclear reactor fuel before separation of the fission products from uranium and plutonium by the use of various organic and inorganic solvents. Because of solvent breakdown caused by radiation, the irradiated fuel must be cooled for a considerable period of time after removal from the reactor before reprocessing can commence. Dissolution of the fuel material in nitric acid requires that large quantities of liquid be handled which necessitates that equipment with large capacities be used for the process and also requires that large quantities of waste products be dealt with for long-term storage.

It is because of these problems associated with the aqueous method of fuel reprocessing that attention has been directed toward the pyrochemical process.

Pyrochemical processes for the recovery of fissionable material from discharged reactor fuels offer promise of achieving a reduction in fuel cycle costs associated with nuclear power. The advantages of the pyrochemical process are that there is a rapid recycle of the fuel with a resultant reduction in fuel inventory, a minimum of chemical conversion steps, small solution volumes and resultant compact equipment, and direct production of solid wastes.

By "pyrochemical" is meant a high-temperature chemical reaction. The pyrochemical method actually encompasses a number of different processes, including melt refining and various processes for core and blanket reprocessing which employ liquid metals and molten salts as processing media.

Because of the high temperatures associated with the pyrochemical process, any change in the process which would reduce the amount of handling of the molten metals would reduce the cost of the process and accordingly improve the efficiency of the system.

We have devised a process for separating plutonium values from uranium values and other fission products which decreases the amount of handling required and increases the efficiency of the separation process.

Accordingly, it is an object of this invention to provide a process for recovering plutonium values from uranium values and from irradiated nuclear reactor fuel and from irradiated nuclear blanket material which is simple to use and which requires a minimum of steps.

It is a further object of this invention to provide a method of separation of plutonium values from uranium values and irradiated nuclear reactor fuel and from irradiated nuclear blanket material where the original composition of the fuel material is unimportant.

The process of this invention comprises adding the irradiated nuclear reactor fuel or blanket material from which most of the rare earth fission products have been removed to a molten magnesium alloy where the plutonium values and noble metal fission products are dissolved and the uranium precipitates out.

After dissolution of the values in the magnesium alloy, the alloy is brought into contact with a fused magnesium halide salt flux which selectively oxidizes the plutonium values in the molten alloy to plutonium chloride which is soluble in the molten salt flux, leaving the dissolved noble metal in solution in the molten magnesium alloy. Refractory metal fission products also remain behind in the molten alloy. The molten salt flux is also in mutual contact with a molten zinc-magnesium alloy which acts as a scrubber solution and which, when contacted with plutonium chloride in solution in the molten salt flux, reduces it to metallic plutonium which then saturates the alloy and then precipitates as a plutonium-zinc intermetallic compound in the molten zinc-magnesium alloy where the plutonium may be easily recovered from the zinc by retorting.

Neutron-bombarded uranium and plutonium metal alloys, oxides or carbides can be used as the starting material for the process of this invention, although the use of a carbide would require that it first be chlorinated or oxidized. The oxides and chlorides will then be reduced by the magnesium alloy. The composition of the magnesium alloy in which the plutonium is dissolved can be varied so long as the plutonium is soluble in the alloy while the uranium remains relatively insoluble, a factor dependent upon the amount of magnesium present in the binary alloy. 15 to 77 weight percent copper, 15 to 97 weight percent cadmium and 15 to 76 weight percent zinc have all been found suitable with magnesium to form an alloy which will meet the solubility requirements at temperatures of 600°–650° C. The amount of copper, cadmium or zinc used within the above limits is dependent upon the melting temperature of the other alloy or the salt used in this process. Generally, it was found that an alloy which gave the lowest melting temperature which was consistent with the molten salt flux used provided the most satisfactory results, usually from 600° to 650° C. However, temperatures up to the boiling point of any alloy or salt could be used if a suitable containment vessel is available.

In addition, because the process of this invention consists of placing two binary alloys in mutual contact with a molten salt flux, it is important that the specific gravity of the alloys in relation to the flux be greater in order that the mutual contact with the flux by each alloy might be maintained without mixing of the alloys.

The molten salt may consist of pure magnesium chloride or a mixture of magnesium chloride with alkali or alkaline earth chloride can also be used. Magnesium chloride for example, has a relatively high melting point (about 715° C.) and therefore is not always most desirable. An equimolar mixture of lithium chloride and magnesium chloride melts at about 600° C. and is often preferred. A mixture of 30 mole percent of sodium chloride, 20 mole percent of potassium chloride and 50 mole percent of magnesium chloride melts still lower, at 396° C. It was found that the higher the concentration of magnesium chloride the higher the distribution coefficient of the metal into the flux and the faster the transfer rate of plutonium. However, the amount of plutonium recovered will be less, since more plutonium will remain in the salt when equilibrium is attained.

The molten scrubbing alloy consists of 2–10 weight percent magnesium in zinc which is continuously kept in contact with the molten salt. The plutonium chloride which is in solution in the salt is reduced when it comes in contact with the zinc—2–10 weight percent magnesium and the reduced plutonium is taken up in the alloy. It has been found that, while the amount of plutonium in solution in the zinc alloy remains constant, as the additional plutonium is reduced it precipitates in the alloy as a zinc-plutonium intermetallic.

In the experiments made, a tantalum crucible was used. However, other materials known to those skilled in the art can be used. The separation can be carried out in an ambient atmosphere of air. However, where the crucible material reacts at the elevated temperature at which the process is carried out with oxygen, the use of an inert atmosphere, such as argon or helium, is necessary.

The mixing rate is important as it affects the rate of transfer of plutonium between the two alloys. Care must be taken, however, to prevent the mechanical carry-over of alloy from one container to the other.

In the following, two examples are given for illustrative purposes. The alloys used in these experiments were copper with 33 weight percent magnesium and zinc with 5 weight percent magnesium. The molten salt consisted of 30 mole percent sodium chloride, 20 mole percent potassium chloride and 50 mole percent magnesium chloride. The experimental procedure was to heat the system to 700° C. and add plutonium metal to the magnesium-copper alloy in which the uranium metal was already present. Solid plutonium, which has a melting point of approximately 650° C., readily becomes molten upon addition to the melt. The system was cooled to 600° C., at which time filtered samples of both metals and the corresponding salt were taken. The molten salt floated on top of the two alloys, contacting both simultaneously.

*Example I*

Four grams of plutonium and 4.35 grams of uranium were added to 300 grams of copper-magnesium alloy. The uranium precipitated out and the plutonium was dissolved in the alloy. Six hundred grams of molten salt were brought into contact with the copper-magnesium alloy while simultaneously in contact with 500 grams of zinc -5 weight percent magnesium. Stirring of 100 r.p.m. was maintained and periodic samples taken of the two alloys and molten salt over a period of 50 hours as shown by the results in Table I.

TABLE I

| Time | Cu-Mg Alloy | | | Zn-Mg Alloy | | |
|---|---|---|---|---|---|---|
| | Metal | | Salt, w/o Pu | Metal | | Salt, w/o Pu |
| | W/o Mg | W/o Pu | | W/o Mg | W/o Pu | |
| 0 | 32.6 | 2.22 | | 5.3 | $6.33\times10^{-5}$ | |
| 30 min | | 2.26 | | | | |
| 60 min | | 0.473 | | | | |
| 120 min | | 0.743 | | | .347 | |
| 24 hr | | 0.0904 | $6.27\times10^{-4}$ | | .323 | $5.26\times10^{-4}$ |
| 50 hr | | 0.0329 | $2.95\times10^{-4}$ | | .35 | $3.1\times10^{-4}$ |

The amount of plutonium shown in the first two samples of the copper-magnesium alloy is questionable and insufficient mixing was suspected. However, the final results showed that 97.5 percent of the plutonium had transferred from the copper-magnesium alloy to the zinc-magnesium alloy. Also, less than 1 percent of uranium was found in the resulting plutonium product.

*Example II*

A second experiment was performed under similar conditions to Example I except that 6 grams of plutonium and 4.35 grams of uranium were added to the copper-magnesium alloy. After the plutonium had dissolved and the uranium had precipitated, stirring was commenced at 300 r.p.m. and periodic samples were taken, the results of which are shown in Table II. At the end of the 24 hour period the temperature was raised to 870° C. to solubilize plutonium precipitates in the zinc-magnesium alloy as a plutonium-zinc intermetallic compound.

TABLE II

| Time | Cu-Mg Alloy | | | Zn-Mg Alloy | | |
|---|---|---|---|---|---|---|
| | Metal | | Salt, w/o Pu | Metal | | Salt, w/o Pu |
| | W/o Mg | W/o Pu | | W/o Mg | W/o Pu | |
| Pre-melt | | 1.78 | | | | |
| 0 min | | 1.325 | | | .00823 | |
| 30 min | | .578 | | | | |
| 60 min | | .433 | | | | |
| 120 min | | .1585 | | | .444 | |
| 24 hrs | | .0124 | $1.18\times10^{-3}$ | | .427 | $1.18\times10^{-3}$ |

It was determined that more than 99 percent of the plutonium transferred to the Zn-Mg alloy while less than 1 percent of the uranium added to the system was found there.

It is to be understood that the invention is not to be limited to the details given herein but that it may be modified within the scope of the appended claims.

The embodiments of the invention in which an exclusive property or privilege is claimed are defined as follows:

1. A process for the separation of plutonium values from uranium values comprising: dissolving said values in a molten alloy of magnesium in which uranium is present in a metallic phase, contacting said alloy with a molten salt containing magnesium chloride to oxidize the plutonium to plutonium chloride which dissolves in the salt, and contacting the salt with a molten zinc alloy containing 2–10 weight percent magnesium to reduce the plutonium chloride to plutonium which precipitates from the molten zinc alloy as a plutonium-zinc intermetallic compound.

2. The process of claim 1 wherein the molten alloy of magnesium contains copper, cadmium or zinc.

3. The process of claim 2 wherein the copper, cadmium or zinc content is from 15 to 97 weight percent.

4. The process of claim 1 wherein the molten alloy of magnesium contains 15 to 77 weight percent of copper.

5. The process of claim 1 wherein the molten salt contains lithium chloride or sodium chloride and potassium chloride.

6. The process of claim 5 wherein the lithium chloride is present from 25 to 75 mole percent, the sodium chloride and potassium chloride are present in concentrations of from 25 to 75 mole percent each.

7. The process of claim 6 wherein the magnesium chloride is 50 mole percent, the sodium chloride 30 mole percent and the potassium chloride 20 mole percent.

8. The process of claim 1 where the atmosphere is inert.

9. The process of claim 1 where the temperature is 600° C.–650° C.

10. The process of claim 1 where the molten zinc alloy contains 5 weight percent of magnesium.

(References on following page)

References Cited by the Examiner

UNITED STATES PATENTS

| | | | |
|---|---|---|---|
| 2,917,382 | 12/1959 | Fedes et al. | 75—84.1 |
| 2,934,425 | 4/1960 | Knighton et al. | 75—84.1 |
| 2,948,586 | 8/1960 | Moore | 23—14.5 |
| 2,968,547 | 1/1961 | Lyon et al. | 75—84.1 |
| 3,011,865 | 12/1961 | Benedict et al. | 23—14.5 |
| 3,063,830 | 11/1962 | Martin et al. | 75—84.1 |
| 3,120,435 | 2/1964 | Chiotti | 75—84.1 |
| 3,147,109 | 9/1964 | Knighton et al. | 75—84.1 |
| 3,148,975 | 9/1964 | Teitel et al. | 75—84.1 |
| 3,148,977 | 9/1964 | Teitel et al. | 75—84.1 |
| 3,169,057 | 2/1965 | Knighton et al. | 75—84.1 |
| 3,218,160 | 11/1965 | Knighton et al. | 75—84.1 |

References Cited by the Applicant

UNITED STATES PATENTS

| | | |
|---|---|---|
| 2,851,333 | 9/1958 | Brown et al. |
| 2,875,021 | 1/1959 | Brown et al. |

BENJAMIN R. PADGETT, *Acting Primary Examiner.*

M. J. SCOLNICK, *Assistant Examiner.*